United States Patent
Molaug

[11] Patent Number: 5,098,334
[45] Date of Patent: Mar. 24, 1992

[54] METHOD FOR THE MECHANICAL GUTTING OF FISH

[76] Inventor: Ole Molaug, P.O. Box 402, 4341 Bryne, Norway

[21] Appl. No.: 531,583

[22] Filed: Jun. 1, 1990

[30] Foreign Application Priority Data

Jun. 6, 1989 [NO] Norway ................. 892305

[51] Int. Cl.⁵ .............................. A22C 25/16
[52] U.S. Cl. ...................... 452/116; 452/106; 452/121
[58] Field of Search ............ 17/58, 11, 51, 59; 452/116, 106, 121, 122

[56] References Cited

U.S. PATENT DOCUMENTS

| | | | |
|---|---|---|---|
| 1,853,328 | 4/1932 | Youman | 17/58 |
| 1,900,267 | 3/1933 | Youman | 17/58 |
| 4,091,506 | 5/1978 | Sorenson et al. | 17/58 |
| 4,117,570 | 10/1978 | Meyn | 17/11 |
| 4,557,016 | 12/1985 | Markert | 17/11 |
| 4,976,010 | 12/1990 | Lavelle, Jr. | 452/116 |

FOREIGN PATENT DOCUMENTS

| | | |
|---|---|---|
| 0264592 | 4/1988 | European Pat. Off. |
| 605987 | 11/1934 | Fed. Rep. of Germany |
| 643245 | 3/1937 | Fed. Rep. of Germany |
| 2832259 | 10/1979 | Fed. Rep. of Germany |
| 76158 | 1/1950 | Norway |
| 134030 | 12/1974 | Norway |

Primary Examiner—Willis Little

[57] ABSTRACT

A method for mechanical gutting of fish and device for execution of the method are disclosed, whereby the inner organs are removed via the fish's oral cavity (mouth) without opening the fish's abdomen. The inner organs are extracted with the aid of a vacuum. A tool is inserted into the fish through the oral cavity and removes the kidneys of the fish (blood ribbon) and the membrane which covers the kidneys. The tools of the device are connected to suitable drive systems of known types and are generally located concentrically about a straight center line and arranged so as to be moveable linearly along and rotatably about this line.

18 Claims, 3 Drawing Sheets

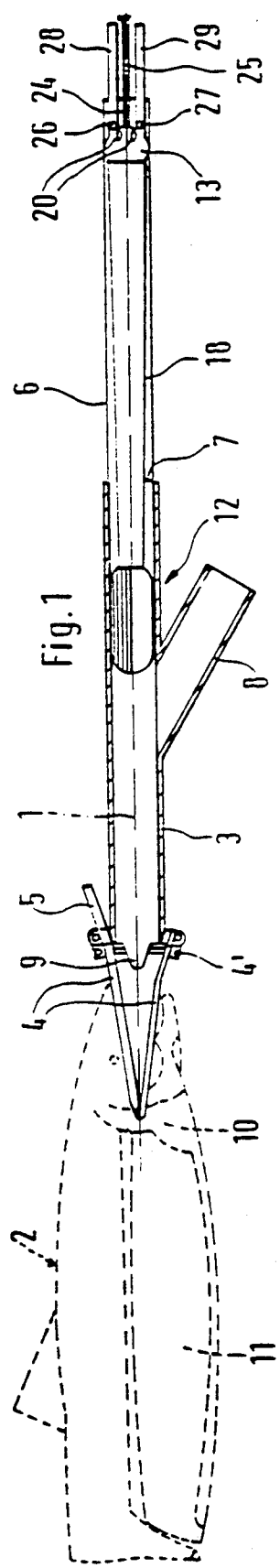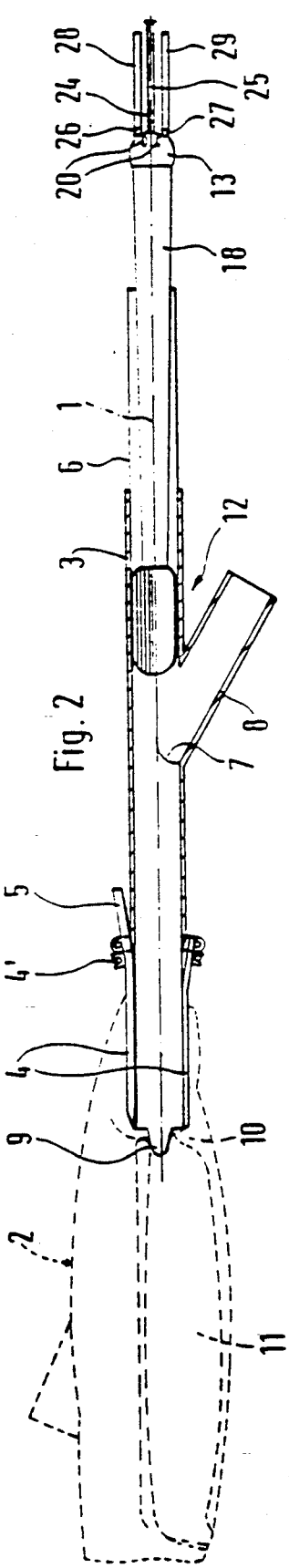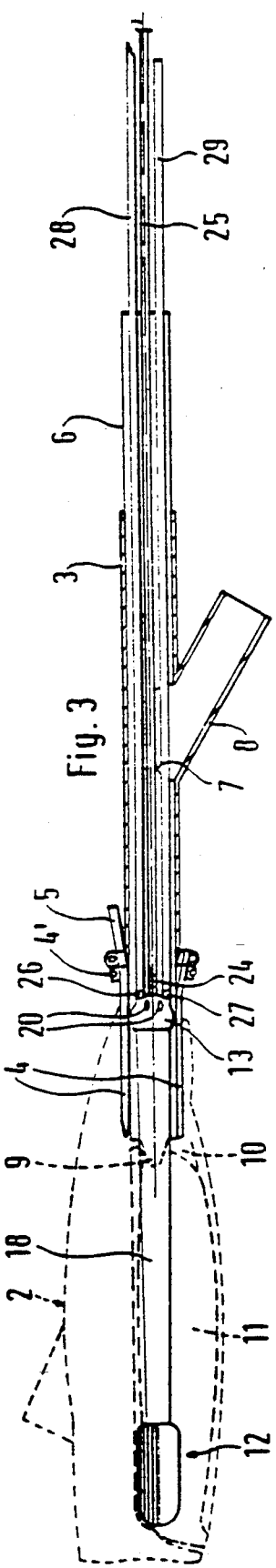

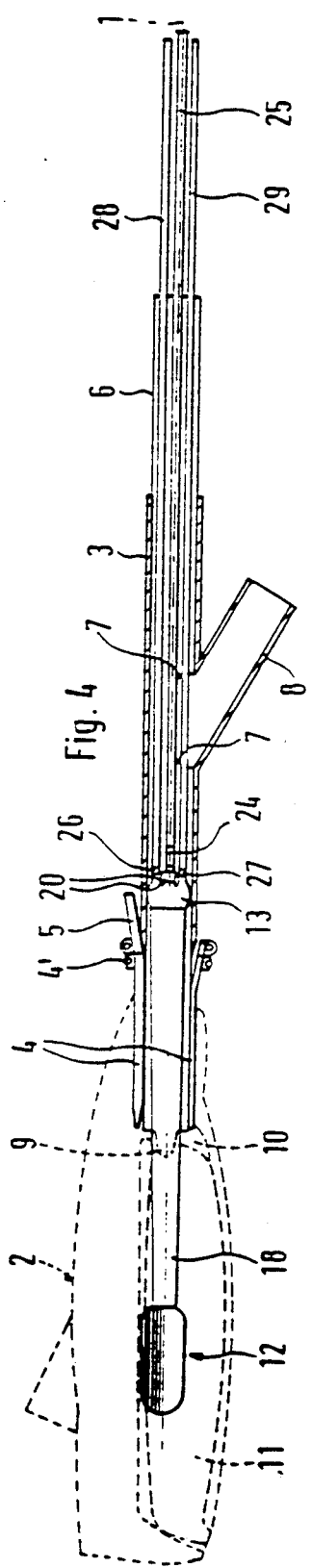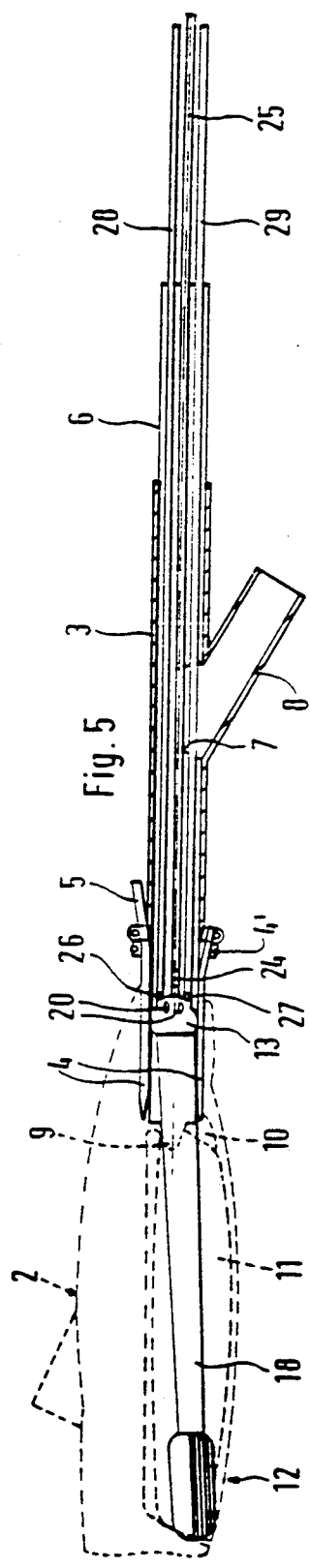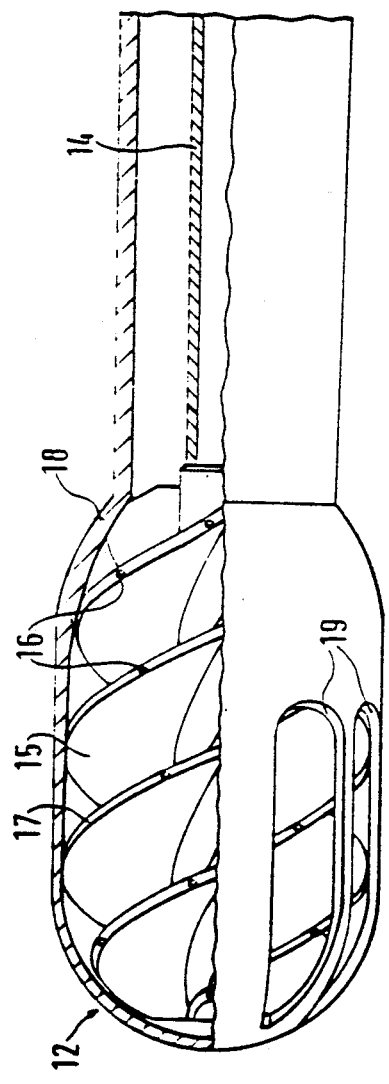

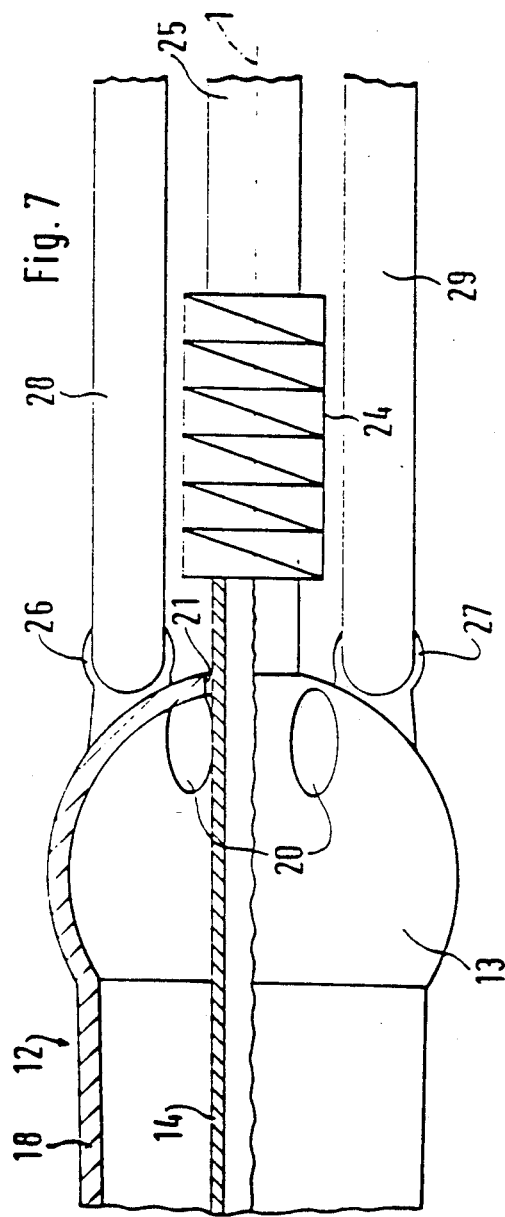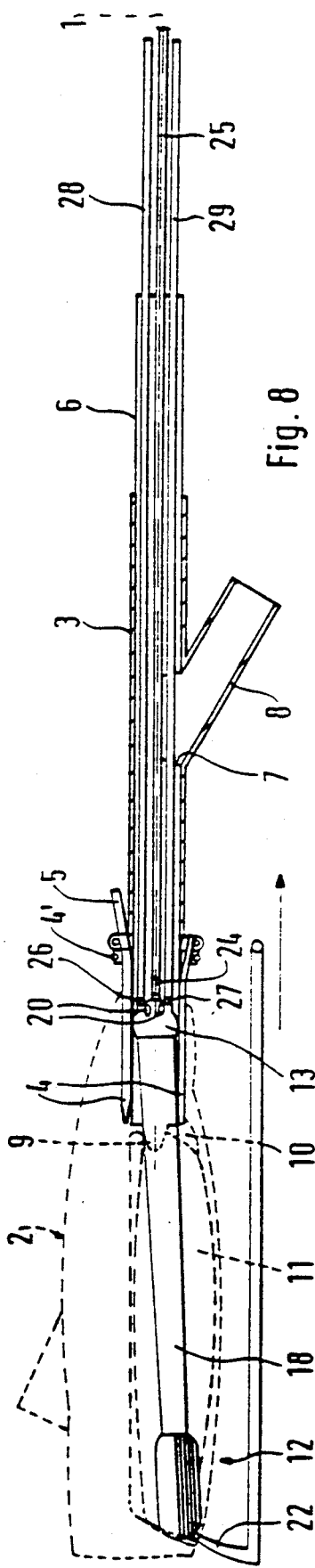

METHOD FOR THE MECHANICAL GUTTING OF FISH

The present invention relates to a method for mechanical gutting (cleaning) of fish and a device for execution of the method.

Mechanical gutting of fish as a part of a process line is well known in the art. Such a process line can also, in addition to gutting, include head and tail chopping, skinning and filleting. Also, division into pieces can be performed with subsequent frying to produce pan-ready products.

With the fish farming industry the requirements for gutting have changed. Extremely strict requirements are made relating to the fish and the processing methods.

In addition to properties which relate to fish shape, color, aroma and taste, requirements are made which relate to how the fish is processed. In Norway special government control arrangements have been established in order to ensure fulfillment of quality requirements. The most important considerations for gutting are as follows:

a) The abdomen must only be opened between anus and ventral fins. Therefore the abdomen must not be opened between head and ventral fins.
b) The incision must be straight and along the middle of the abdomen.
c) The fish must be flushed clean, with inner organs (entrails) completely removed.
d) The kidneys (blood ribbon) must be removed.
e) The peritoneum (abdominal membrane) must not be damaged.
f) The gall bladder must not be damaged, causing gall to come into contact with the fish meat.

Of the requirements listed above, points a) and b) are principally of an aesthetic nature. Point c) is partially of aesthetic nature, but is also of importance to properties such as storage lifetimes and taste changes during storage. The last factor is particularly relevant for points d), e) and f).

The head and tail are not normally to be removed from the fish.

Farmed salmon has become a common dish in restaurants throughout the world. In addition to its good taste, great stress is placed on preparing fish dishes which look good on the guest's plate. In order to achieve this, many chefs prefer to buy non-gutted (round) fish. By round-gutting the fish and cutting it into slices, round fish steaks are obtained with the meat intact in the abdomen. Steaks of this type are more attractive than if the abdomen has been cut open.

Round-gutting is performed by first chopping off the head and then pulling out the entrails. The fish is then cut into slices which are each cleaned to remove the kidneys (close to the backbone) and associated traces of blood.

There is no method previously known in the art, other than gutting by hand, which can be employed for gutting of fish in such a way that the requirements imposed for farmed fish can be met.

The present invention embraces a method and a device for the mechanical round-gutting of fish without removing the head.

According to the invention is it possible, and optional, to cut open the abdomen in full, or only in parts, if so desired. It is therefore possible to satisfy the regulations which apply to gutting of farmed fish. At the same time, round-gutted fish can be supplied. It is then possible to satisfy the aesthetic (table) requirements for the fish dish, while simultaneously satisfying the requirements for gutting as promptly as possible after slaughtering.

This method is achieved by removing the inner organs through the oral cavity (mouth) of the fish. Removal of the kidneys and associated membrane and internal flushing are performed by inserting a tool into the fish through the oral cavity. This means it is not necessary to cut open the fish's abdomen to do the actual gutting. if one wants to cut open the abdomen, or parts of it, this can be done either before or after gutting.

The gutting method according to a preferred embodiment of the present invention can be generally described in the following steps:

1. The fish is held in a channel, the fish's mouth is opened, and held open by a suitable device;
2. A cutting tool is inserted in the oral cavity which cuts away the oesophagus (gullet) from the neck and throat;
3. A vacuum is applied in order to remove the fish's inner organs by suction, the intestines either severing from the anal opening as the inner organs are extracted or being released from the anus by a small incision made with a cutting tool from the outside;
4. A tool is inserted into the fish's oral cavity which can extend into the abdominal cavity in order to extract the fish's kidneys (blood ribbon) and the associated membrane and which may be combined with internal washing and flushing;
5. As necessary, a special flushing tool is inserted into the fish through the oral cavity for internal flushing;
6. As necessary, a special flushing tool is inserted into the fish through the oral cavity for internal flushing;
7. As desired, an inspection tool is inserted into the fish through the oral cavity and, as appropriate, right into the abdominal cavity for visual inspection;
8. As desired, the abdomen of the fish is filled with ice;
9. As desired, the fish's abdomen is cut open from the inside or outside, preferably after the inner organs of the fish have been removed.

An exemplary embodiment of the method according to the invention and an exemplary embodiment of a device for execution of the method will be described hereinafter in connection with the enclosed schematic drawings, where:

FIG. 1 shows a fish which is held in a channel, not shown, and a device according to the invention, partially in section, for gutting of fish, where the various tools of the device are in their initial position;

FIG. 2-5 show the same as FIG. 1 but in different stages of the round-gutting of the fish;

FIG. 6 and 7 show to larger scale and partially in section, two end sections of one of the device's tools; and FIG. 8 shows another of the device's tools comprising a moveable knife on the outside of the fish.

The tools shown in the figures are connected to suitable working mechanisms of known types.

The tools of the device are generally deployed concentrically about a straight centerline and arranged so as to be moveable linearly along this line and rotatably about this line.

FIG. 1 shows as already noted a fish 2 with the tools in the initial position. At one end of an outer tube 3 is provided an assembly comprising a plurality of tubular rods 4 so arranged that one end of the rods can be hinged radially inward towards and outward from the centerline 1. One or several of the rods 4 is furnished with an extension 5 which can be connected to water or compressed air, for example. A spring arrangement or elastic 0-ring 4' seeks to hold the rods 4 in closed position, as shown in FIG. 1.

Inside the outer tube 3 is a moveable inner tube 6 with a cutout 7.

The outer tube 3 is furnished with a branch 8 which is connected to a vacuum system, not shown, which can be connected, as appropriate, to an ice feeder system, not shown.

Once the fish is held fast in the channel, not shown, the method according to the invention starts by the inner tube 6 being inserted into the oral cavity along the centerline 1. The rods 4 are then pressed outward against the throat and distend it. This position is shown in FIG. 2.

The inner tube 6 is provided at the end which faces the fish with one or several sharp knives 9. By rotating the inner tube 6 about the centerline 1, the gullet 10, see FIG. 2, will be cut away from the throat. The inner organs of the fish are now only attached at the anus.

In the position shown in FIG. 2 the cutout 7 in the inner tube 6 lies over the branch 8, providing coherent connection between the branch 8 and the abdominal cavity 11 via the inner tube 6.

A vacuum is then applied to branch 8 at the same time as water or air, or a mixture of water and air, is brought into the fish's abdominal cavity 11 through the tubular rods 4. This prevents the abdominal cavity 11 from being sucked flat, at the same time as internal flushing is achieved.

The inner organs of the fish are sucked out via the inner tube 6 and cutout 7 through branch 8. The intestine of the fish will part either at its connection to the anus or somewhere between the anus and the stomach.

Once the inner organs have been removed, a tool 12 is inserted into the abdominal cavity 11, see FIG. 3 and 4. Tool 12 has a cutting side which ruptures the kidneys along the backbone and removes the kidneys and associated membrane. This is effected through a combination of mechanical working, flushing with water, and removal by vacuum.

Once the kidneys and associated membrane have been removed, the tool 12 is turned to bring the cutting side towards the ventral aspect and anus. See FIG. 5. The tool 12 is moved towards the anal opening by a hinge motion about a spherical joint 13. Any remains of the intestines are removed by tool 12 in this position.

If it is desired to refill (stuff) the abdominal cavity 11, for example with ice, this can be effected via branch 8 and the inner tube 6 in the position shown in FIG. 2.

Once the treatment of the fish is complete, tool 12 is retracted to its starting position, as shown in FIG. 2. The inner tube 6 is then retracted to its starting position, shown in FIG. 1. This causes the rods 4 to be folded inward by the 0-ring 4' toward the centerline 1, and the fish 2 is released.

Tool 12 may be designed in several ways. The description here is of an exemplary embodiment with reference to FIG. 6.

Tool 12 has an inner tubular shaft 14, which at the end which is inserted into the fish, is furnished with one or several screw threads 15. The other end the shaft 14 is connected to pressurized water and compressed air, enabling water and/or air to be conducted through the shaft and out through holes 16 which connect the outer face 17 of the screw threads to the hollow core of the shaft 14. At the same time shaft 14 is arranged to rotate about the centerline 1 relative to an outer casing 18.

The outer casing 18 is shaped so as to provide good clearance to the shaft 14 and very little clearance to the outer screw face 17.

At the opposite end of the tool 12 the outer casing 18 is shaped as a portion of a sphere 13. See FIG. 7. In the spherical portion 13 there is a plurality of holes 20 of unspecified number.

A central hole 21 in the spherical portion 13 serves as channel for the shaft 14 which is connected to one end of a flexible tubular coupling 24. The other end of this coupling 24 is connected to a rotatable tubular drive shaft 25.

The spherical portion 13 is furnished with two jointed attachments 26 and 27 which are connected to their respective push rods 28 and 29. The spherical portion 13 acts as bearing against the inner tube 6, so that, by moving push rods 28 and 29 relative to each other, the tool 12 can be hinged between different positions, as shown in FIG. 4 and 5.

By moving the push rods 28 and 29 and drive shaft 25 synchronously along the center line 1, the tool 12 can be moved into and out of the fish, as shown from FIG. 2 to FIG. 3.

On a part of the casing 18 are formed a plurality of slots 19, which, when the shaft 14 rotates, effect a cutting action between the screw thread 15 and slots 19, as basically known in the art, for example for electric razors.

By feeding liquid into the hollow core of the tubular drive shaft 25 and on through the coupling 24 and shaft 14, there will arise a flushing and washing effect since liquid will flow out through the holes 16 and on out through the slots 19, see FIG. 6.

When the tool 12 is inside the fish, see FIG. 3, 4, 5, the branch 8 through the cutout 7 and also the holes 20 and 21 in the spherical portion 13—forms a coherent vacuum connection which, from the inside of the spherical portion 13, extends into the outer casing 18 right up to the slots 19.

The result is that, when the tool 12 is working in the abdominal cavity 11 of the fish, fluid jets are sprayed out through the slots 19, at the same time as worn off tissue from the kidneys and associated membrane, and intestine remnants, are sucked in through the same slots 19, and out through the branch 8.

Tool 12 can also replace knife 9 by locating tool 12 in the throat of the fish and moving it in a circle at the same time as it rotates. The cutting slots 19 will then cut the fish's gullet away from the throat.

If the abdomen of the fish is to be opened, this ought to be done after the internal organs have been removed. Opening can be done, for example, with an external knife 22 which is first inserted into the anus, then moved towards the head in a straight line until the desired incision length is made. See FIG. 8. The tool 12 can be used as backing piece for the knife 22, and the cutting movement can be synchronized with the retraction of the tool 12.

I claim:
1. The method of removing inner organs from a fish comprising the steps:

a) holding a fish in a channel, opening the mouth, and maintaining the open position of the mouth;

b) cutting away the gullet from the neck and throat of the fish;

c) removing the gullet through the oral cavity of the fish;

d) extracting the inner organs and tissue of the fish through the oral cavity while maintaining the abdomen of the fish intact;

e) cutting and extracting the kidneys and associated membranes through the oral cavity while maintaining the abdomen of the fish intact;

f) flushing our remaining disassociated elements from inside of the fish.

2. A method as claimed in claim wherein step (d) is further defined by extracting the inner organs as tissue of the fish through the oral cavity by suction.

3. A method as claimed in claim 1, wherein step (e) is further defined by extracting the kidneys and associated members through the oral cavity by suction.

4. A method as claimed in claim 1, comprising the additional step, after step (f); of refilling the abdominal cavity with material selected from the group consisting of fluid, ice, or combinations thereof.

5. A method as claimed in claim 1, wherein step (b) is further defined by cutting away the gullet from the neck and throat of the fish by using a cutting tool, where the cutting portion of the tool is within the oral cavity.

6. A method as claimed in claim 1, comprising the additional step, after step (f), of visually inspecting said fish by inserting an inspection tool through the oral cavity.

7. A method as claimed in claim 1, comprising the additional step, after step (f), of opening the abdomen from either the interior or the exterior of the fish.

8. An apparatus for removing the inner organs from a fish comprising:

insertion means adapted for insertion in the mouth of a fish for maintaining the mouth of said fish open;

first means operable for severing and removing through said insertion means the gullet of the fish via the mouth;

second means operable through said insertion means for extracting the kidneys and associated membranes of the fish via the mouth;

suctioning means operable through said insertion means for removing the inner organs of the fish via the mouth; and means for flushing out any remaining disassociated numbers from the inner cavity of the fish.

9. An apparatus as claimed in claim 8, wherein said insertion means consists of an inclined axially symmetric portion of a mechanical device supported by an outer tube and containing an inner tube.

10. An apparatus as claimed in claim 9, wherein said first means consists of at least one knife fastened at one end of the inner tube arranged to cut the gullet of the fish.

11. An apparatus as claimed in claim 9, wherein said suctioning means consists of a branched portion of the outer tube which may be aligned with a cut out portion of the inner tube thereby creating a pathway whereby the inner organs may be removed when said suctioning means is connected to a vacuum.

12. An apparatus as claimed in claim 8, wherein said second means consists of a helical blade, covered by a casing, said casing containing a plurality of slots, such that rotating said second means results in a cutting action between the helical blade and the slot.

13. An apparatus as claimed in claim 12, wherein said helical blade contains a plurality of flushing bores, such that liquid will flow out through the holes and then through the slots.

14. Device for execution of the method given in claim 1, characterized in that the device principally consists of: a) an outer tube (3) which at one end is furnished with an assembly (4, 4', 5) designed to distend the fish's (2) mouth and throat when the outer tube (3) is inserted into the fish's oral cavity; b) an inner tube (6), movable and rotatable in the outer tube (3), with a cutout (7) so positioned as to be able to communicate with a branch (8) which is connectable to a vacuum system and is on the outer tube (3), whereby a coherent connection can be established between the branch (8) and the fish's abdominal cavity (11) via the inner tube (6); c) one or more knives (9) fastened at one end of the inner tube (6) and arranged to cut the fish's gullet loose from the throat; d) an arrangement (4, 5) to conduct water and/or air, or other 15. A method for gutting a fish comprising the steps of:

inserting extracting and cleaning tools into a body cavity of a fish through an oral cavity of the fish;

removing the inner organs of the fish, including kidney tissue of the fish, through the oral cavity of the fish by means of the extracting and cleaning tools without opening the abdomen of the fish, and refilling the fish's abdominal cavity with a fluid contemporaneously with the extraction of the inner organs of the fish.

16. A method according to claim 14, wherein said step of removing the inner organs of the fish is further defined by using a vacuum to assist the removal of the inner organs of the fish by the extracting and cleaning tools.

17. A method according to claim 15, further comprising the step of refilling the fish's abdominal cavity with ice after the fish's inner organs have been extracted.

18. A method according to claim 15, wherein the step of inserting extracting and cleaning tools into a body cavity of a fish is further defined by the steps of:

holding the fish in a channel, opening the fish's mouth and holding the fish's mouth open with a special instrument; and inserting a cutting tool into the oral cavity of the fish to cut the gullet loose from the neck and throat, and wherein the step of removing the inner organs of the fish is further defined by the steps of:

applying a vacuum to assist the removal of the fish's inner organs by the extracting and cleaning tools;

inserting one of the extracting and cleaning tools into the fish through the oral cavity of the fish, which can extend into the abdominal cavity, in order to extract the fish's kidneys and the membrane which covers the kidneys, said tool subjecting the kidneys and associated membrane to simultaneous mechanical working, flushing with liquid, and suctioning off of removed tissue;

moving the tool towards the anal opening in order to remove any remains of the fish's intestine;

inserting, if necessary, one of the extracting and cleaning tools into the fish through the oral cavity of the fish for internal flushing of the fish;

inserting, if desirable, an inspection tool into the fish through the oral cavity of the fish and, as appropriate, right into the abdominal cavity, for visual inspection; and refilling, f desirable, the abdominal cavity of the fish with ice.

* * * * *